Figure 1:
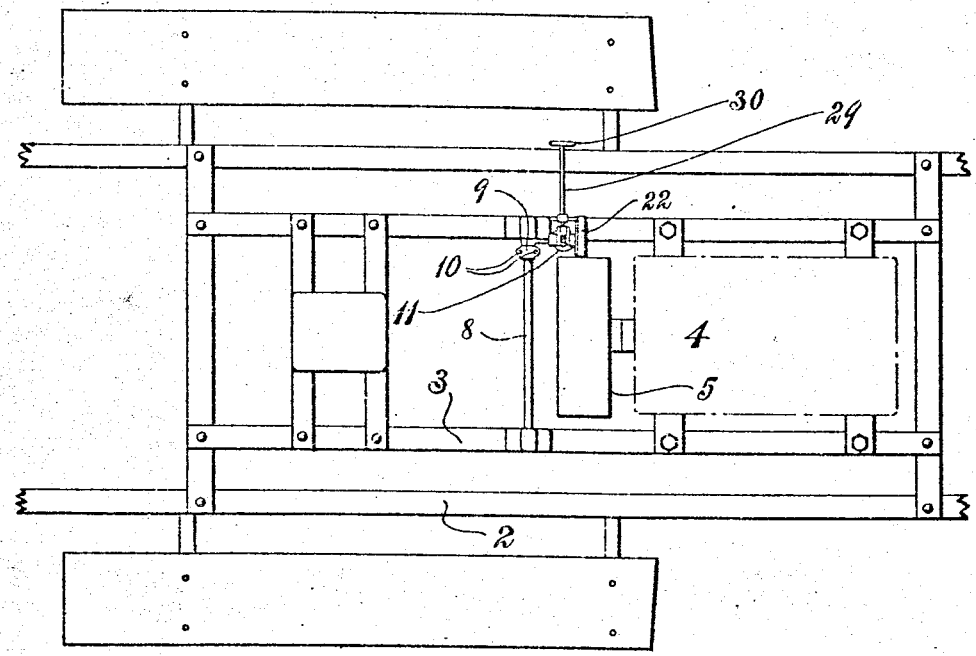

E. E. TRYON.
AIR PUMP.
APPLICATION FILED FEB. 9, 1910.

985,476.

Patented Feb. 28, 1911.
2 SHEETS—SHEET 1.

Witnesses:
C. B. Anderson
James H. Keane

Inventor:
E. E. Tryon
By his Attorneys,
Sutherland & Anderson

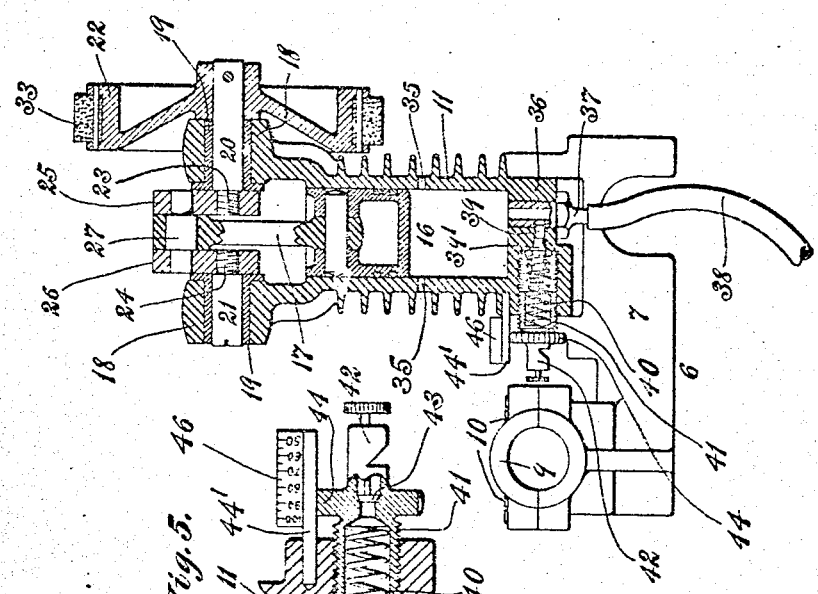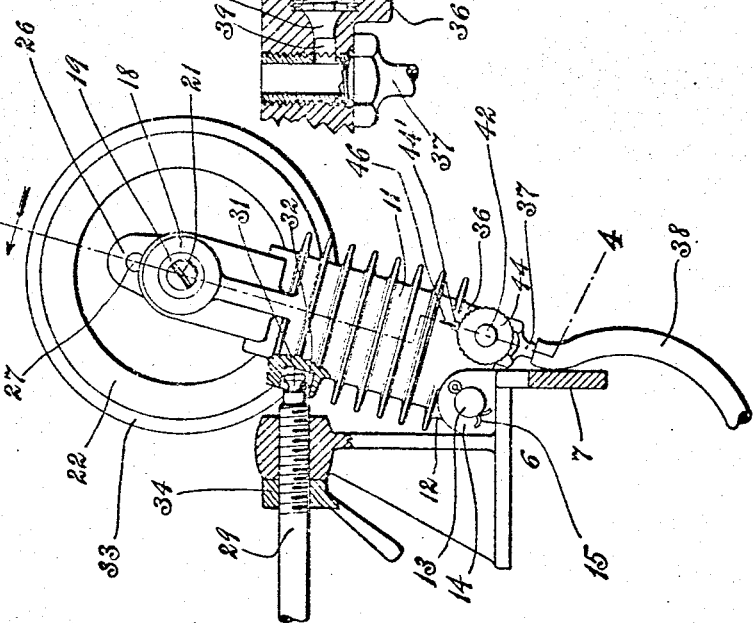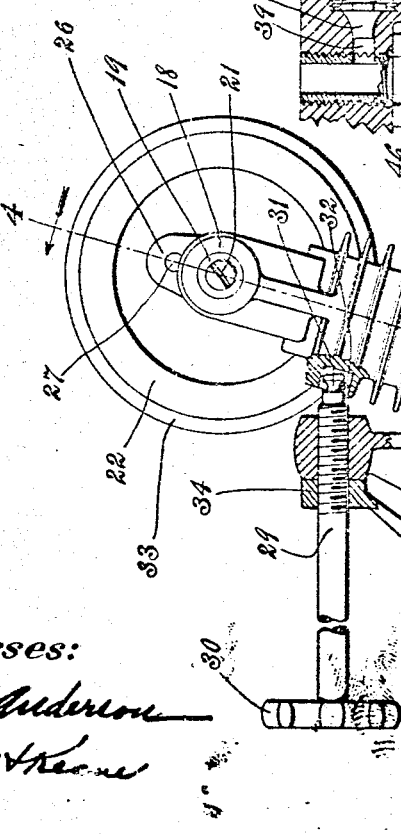

UNITED STATES PATENT OFFICE.

EDWARD E. TRYON, OF WEST HARTFORD, CONNECTICUT, ASSIGNOR TO THE TRYON AUTO PUMP COMPANY, OF NEW YORK, N. Y., A CORPORATION OF NEW YORK.

AIR-PUMP.

985,476.   Specification of Letters Patent.   Patented Feb. 28, 1911.

Application filed February 2, 1910. Serial No. 542,926

*To all whom it may concern:*

Be it known that I, EDWARD E. TRYON, a citizen of the United States, residing at West Hartford, in the county of Hartford and State of Connecticut, have invented certain new and useful Improvements in Air-Pumps, of which the following is a specification This invention relates to air pumps and a pump comprising my invention can be employed with advantage in many different connections, one being to inflate the tires of an automobile and another to fill a storage tank with compressed air.
In the drawings accompanying and forming part of the present specification I have represented in detail one simple and effective form of embodiment of the invention which to enable those skilled in the art to practice the invention will be set forth in full in the following description while the novelty of the invention will be pointed out in the claims succeeding said description from which it will be evident that I do not restrict myself to the showing made by said drawings and description. As a matter of fact I may make radical departures from such disclosure within the scope of my invention as expressed in said claims.
In the form of embodiment of the device herein set forth said device is adapted for inflating the tires of automobiles the construction being such that the pump can be operated by the power of the motor which drives said automobile of whatever type said motor may be; that is the motor may be a gas engine or electric motor.

The pump possesses several features of novelty which may be employed individually or collectively as may be desired and one of these is a simple form of crankshaft, which is made up of a small number of parts which can be assembled with facility and rapidity. Another is a simple and effective means for regulating the amount of pressure, and another is a means whereby the motor can be utilized for maintaining the pump-carrier in operative position.

Figure 2:
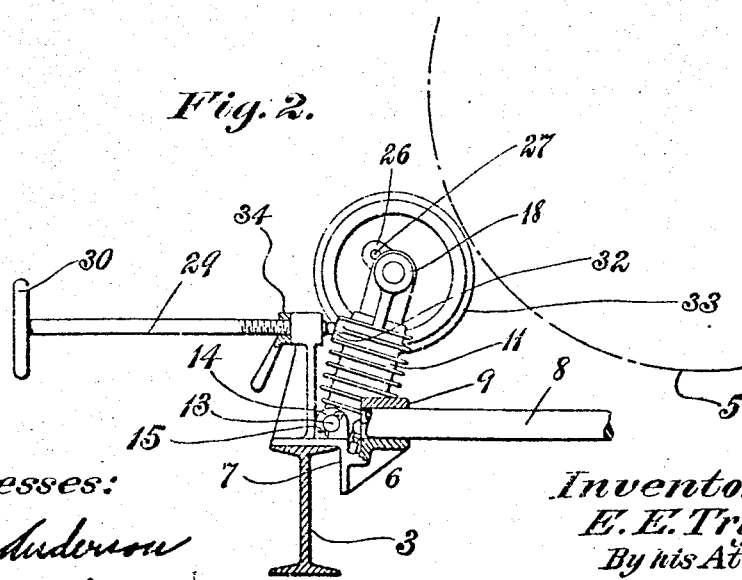

The pump possesses other features of novelty which with the foregoing will be fully set forth in said description Referring to said drawings, Figure 1 is a top plan view of portion of the main framing and other portions of an automobile provided with a pump including my invention. Fig. 2 is a sectional view of the subframe of the automobile carrying the pump which is shown in elevation, the fly-wheel of the motor being also shown in this view.
Fig. 3 is a side elevation of the pump with the carrier therefor in section. Fig. 4 is a section on the line 4—4 of Fig. 3. Fig. 5 is a detail view of the blow-off device.

Like characters refer to like parts throughout the several figures.

As I have already indicated my pump may be used with utility in many different ways it being especially applicable as an adjunct to automobiles and it is of such a nature that it may be interchangeably mounted upon any of the existing types of cars of this character whereby the motor which normally drives said car can be utilized for operating the pump and as will hereinafter appear the construction is such that the carrier for the pump can be held in position without the use of fastening means, the motor being utilized to apply its thrust to said carrier to maintain the same in a stable and substantial condition during the inflation of one or more of the tires. The pump can be used for supplying compressed air to storage tanks, such for example as are found on motor boats and the compressed air from which is provided for blowing a whistle.

In Figs. 1 and 2 of the drawings I have shown portions of an automobile of known form and I will briefly describe these so that the advantages of the pump can be the better understood. Referring now especially to Fig. 1 the numeral 2 denotes the main frame of a familiar type of automobile, 3 the sub-frame which is generally utilized to sustain the motor, and 4 the motor which is shown only conventionally in this view and while it is not a matter of consequence what member of the motor operates the pump I secure excellent results when the fly-wheel 5 of said motor is employed for this purpose and as will hereinafter appear the pump comprises a member which may be put into and out of contact with the periphery of said fly-wheel at will and which is operatively connected with the piston of the pump.

The pump proper by which I mean the cylinder, piston and adjunctive devices, is supported by a suitable carrier and one such as that denoted in a general way by 6 answers my purpose in this respect. The carrier which may be of any suitable shape and formed in any desirable manner, for instance by casting, involves a body as 7 which is shown as being of right-angular form in cross section thereby presenting two branches one of which may be horizontally disposed and sustained upon the rear cross bar of the subframe 3 as shown in Fig. 2 and the other and pendent branch of which can be fitted against the front of said cross-bar, whereby on the application of thrust in the proper direction the carrier can be held in place without the aid of fastening means such as bolts or screws which under ordinary circumstances would be provided to hold the carrier in position while the pump is in action, it being evident that the horizontal branch of the body 7 rests flatwise upon the said rear cross-bar. The particular construction of the carrier however is not material although the maintenance of the same in position without the aid of mechanical holding means is as will be gathered of especial utility. I do, however, prefer to provide means for steadying the carrier to prevent it for instance from lateral movement and this means may be of any convenient kind although as will hereinafter appear I prefer to provide the carrier 6 with means which is connected with the clutch-shaft 8, for accomplishing the result in question. There may be cases, however, where I could dispense even with this steadying means. The said carrier 6 is provided with a split-boxing or clamp 9 which is adapted to fit around said clutch shaft for the purpose indicated. The lower section of the boxing is, in the present case, integral with the horizontal portion of the body 7, the upper section thereof being removably mounted and being adapted to be held in operative position by one or more screws 10 by removing which the boxing or clamp can be fitted around the said clutch shaft or equivalent device after which the screws 10 will be applied.

The cylinder of the pump is denoted by 11 and as will hereinafter appear said cylinder is movably mounted being preferably though not necessarily, supported for swinging movement by the carrier 6. Said cylinder is shown as peripherally corrugated or ribbed such construction providing for external circumferential channels for the passage of air which is an inexpensive means for cooling the cylinder. The cylinder like its carrier may be also cast, and it is shown provided at its lower closed end with an enlargement 12 laterally bored to receive the pivot pin 13 which is supported by and extends through transversely alined ears 14 on the upper side of the carrier body 7, the pivot pin being held from displacement by cotter pins as 15 extending through perforations near the ends thereof. From this it will be obvious that it is a simple and easy matter to mount the cylinder; in fact all the parts of the device can be quickly assembled as will hereinafter more particularly appear.

The piston for the pump is denoted in a general way by 16 and it is connected through the pitman or connecting rod 17 with a crank shaft of novel construction which will now be described and which is sustained by bearings 18 of solid construction which rise from and which are shown as integral with the cylinder 11. This solidity of construction which insures strength and cheapness is secured by making these bearings in one with the cylinder. The bearings 18 receive bushings 19 the headed inner ends of which fit against the inner surfaces of said bearings and in these bushings, which preferably tightly fit the bearings, are mounted for turning movement the pivots 20 and 21 which present collectively the straight portion of the crank-shaft of the pump, the driving-wheel or power-applying member of the pump, which may consist of the wheel 22 being pinned or otherwise suitably connected with the shaft member or pin 20. The inner ends of the pins are reduced thereby forming shoulders thereon and these reduced portions are threaded as at 23 and 24, the thread of the pin 20 being left while the thread of the pin 21 is right the result being that when the pump is in action the mere rotation of the power-wheel 22 serves to draw the pins inward or to automatically run the same home. Even while the pump is at rest this reverse threading of the pins is advantageous in that there is practically no tendency to shake the same loose by the vibration of the car. The threaded portions 23 and 24 of the two pins or pivots 20 and 21 respectively are tapped into the crank-arms 25 and 26 which are transversely alined and which together present the crank portion of the shaft. The two crank members are entirely separate; that is they are not made integral and when alined they will be jointed to the connecting rod 17 by the pivot 27. The shaft construction is a very simple one and the parts can be quickly separated and put together.

While I have referred to the wheel 22 as a power and a driving wheel, it is such so far as the pump is concerned, although it is driven from or by the motor 4 for instance by having its periphery brought into driving or frictional contact with the fly or balance wheel 5 and the fact that the cylinder 11 is mounted to swing permits this wheel to be readily put into or out of contact with the fly-wheel means as will hereinafter appear being provided to shift the cylinder to secure this result.

The carrier body 7 is shown provided with an integral standard or upright 28 through which is tapped at the upper extremity thereof, the hand-operable screw 29 provided with a wheel 30 at its outer end to facilitate its rotation and the consequent movement of the cylinder 11, said screw having a loose connection with the cylinder whereby there will be no bind upon the screw or any tendency to bend the same during the swinging movement of said cylinder. The inner end of said screw is shown as fitted in an opening in the rear portion of the cylinder 11 and as having a somewhat deep annular groove 31 to receive the pin 32 removably carried by the said cylinder, the pin 32 moving relatively up and down in said groove on the swinging motion of said cylinder. Therefore by turning the hand-wheel 30 the said cylinder through the described intermediate parts can be so operated as to put the wheel 22 into or out of driving relation with the fly-wheel 5. The said wheel 22 is provided with some elastic or yieldable medium and the purpose of this will be hereinafter set forth. A leather band as 33 fitted around and secured to the rim of the said wheel presents a satisfactory device for this purpose in that the best possible tractive effect is obtained. When the wheel 22 is put into engagement with the fly-wheel 5, the former will be preferably positively held or locked in such position until the tires have been inflated to the requisite extent and for this purpose the locking lever 34 may be provided, said lever being set when the wheel 22 is in firm driving contact with the fly-wheel. It will be evident that it is not essential that the two wheels 22 and 5 be put into peripheral engagement as said wheel 22 in some cases may be driven by contact with the fly-wheel laterally thereof.

The cylinder 11 has a side inlet or air intake 35 and after the piston 16 has passed this inlet on its down stroke it will serve to compress the air between the piston and the closed lower end of the cylinder 11. Said lower end is shown provided with a bulge 36 provided with a nipple 37 to which a flexible pipe 38 may be connected for conducting the compressed air to the tires, the pendent portion of the carrier body 7 being slotted to receive this pipe so that the same can be more easily made to supply the different tires. The bulged portion 36 has interiorly thereof the relief port 39 at one side of which is a substantially conical valve seat for the valve 39' the stem of which is surrounded by a coiled push spring as 40 fitted within the tubular portion of an externally threaded pipe member 41 which is threaded into the said bulge, said pipe member or nipple 41 being provided at its outer end with a whistle 42 which will be sounded by the escaping air when a predetermined amount of compression has been reached. Between the whistle 42 and the cylinder 11, the pipe member or nipple 41 is provided with a cock or valve 43 which will be closed when the relief or blow off means is not to be used which would be for example when the pumps is operated to supply an air storage tank. When the pump, however, is used for inflating automobile tires I prefer that the whistle be used, the stop-cock then being opened so that the chauffeur or owner of the car will be audibly apprised when the tires are inflated to the desired extent. By regulating the tension of the spring 40 the pressure under which the relief or blow-off valve 39 will be opened can be varied and to thus adjust the tension of the spring the pipe member or nipple 41 may be provided with a disk or finger portion 44 by which said pipe member can be readily turned to thereby vary the tension of the said valve-closing spring 40 which as will be obvious exerts a constant valve-closing tendency. If the spring be tensioned to permit the valve 39 to open at one hundred pounds pressure, said valve will by the back pressure from the tire be instantly opened when this pressure is reached the escaping air operating the whistle 42 at which time the cylinder 11 is shifted to carry the wheel 22 out of contact with the wheel 5 although owing to the flexible or elastic covering of said wheel it will not matter if this is not at once done as there will be "slip" between the two wheels when this occurs so that the wheel 22 will not be turned.

It will be observed that when the wheel 22 is against the wheel 5, the thrust of the wheel 5 is somewhat diagonally directed or toward the rear and downward by reason of which this thrust can be utilized to hold the carrier 6 to its seat. This is one of the more important features of the invention and although as I indicate the thrust is applied in the direction set forth it may be otherwise applied.

I desire to call attention to the fact that the wheel 22 is dished on its inner side by reason of which said wheel can be arranged very close to the cylinder 11 by virtue of which a compact structure is assured, the bearing 18 on the left in Fig. 4 which constitutes a part of said cylinder fitting within the cavity of said wheel. The cavity or dished effect of the wheel may be obtained in several ways, but I prefer to obtain this result by inclining the web of said wheel as illustrated the inclination being, as illustrated, in the view mentioned, of such nature as to secure the cavity on the inner side of the wheel.

I provide means of a positive nature for maintaining the nipple or pipe member 41 in an adjusted position and I have shown the spring detent or dog 44' for this purpose the shank of the same being suitably fastened to the lower portion of the cylinder 11 and the free end or portion of which is adapted to engage between circumferential teeth of the disk or flange 44. This pressure of the spring detent is sufficient to prevent accidental turning of the nipple 41 although it should not be enough to prevent the comparative free turning of said nipple by hand. By thus locking the said nipple 41 the valve 39 may be held to its seat in a certain manner until the predetermined pressure is reached. This detent in addition to serving as such also presents a gage or indicating member having on its forward surface a scale 46 graduated longitudinally of the detent and which may be easily read to indicate the compression at which the relief valve is set to open.

The crank shaft illustrated in the drawings and hereinbefore described is not specifically claimed herein, it being the basis of a copending application filed September 24, 1910, Serial No. 583,552.

What I claim is:

1. The combination of a base having a standard, a cylinder pivotally supported by the base, a laterally-immovable screw rod having a threaded connection with said standard for feed movement and also having a sliding connection with the cylinder, a crank shaft supported by said cylinder, a piston in the cylinder operatively connected with said crank shaft, and a wheel rigidly connected with said crank shaft.

2. The combination of a pivotally mounted cylinder provided with a pair of bearings, a piston in said cylinder, a rotary crank shaft supported by said bearings and operatively connected with said piston, a wheel connected with said crank shaft, and manually operable means for swinging said cylinder, connected with the same at a point between said bearings.

3. The combination of a base provided with a standard, a cylinder pivotally supported by said base and provided with a pair of bearings, a crank shaft supported by said bearings, a piston in the cylinder, operatively connected with said crank shaft, a wheel fastened to said crank shaft, and a screw rod having a threaded connection with said standard and a loose connection with the cylinder at a point between said bearings.

4. The combination of an air pump, a portable carrier for said pump, said pump having an operating member adapted to be operated by an independent motor, the parts being arranged to cause the motor to apply its thrust to the carrier to hold the same to its support, and said carrier having shaft-embracing means to be connected with a suitable shaft, for steadying the carrier during the action of the pump.

5. The combination of an air pump, a portable carrier for said pump, said pump having an operating member adapted to be operated by an independent motor, the parts being related to cause the motor to apply its thrust to the carrier for holding the same to its support, and said carrier having a split boxing adapted to receive a shaft to thereby steady the carrier.

In testimony whereof I affix my signature in presence of two witnesses.

EDWARD E. TRYON.

Witnesses:
HEATH SUTHERLAND,
F. E. ANDERSON.